(12) United States Patent
Yamamoto et al.

(10) Patent No.: US 9,651,139 B2
(45) Date of Patent: May 16, 2017

(54) AUTOMATIC TRANSMISSION SHIFTER

(71) Applicant: Delta Kogyo Co., Ltd., Hiroshima (JP)

(72) Inventors: Ichiro Yamamoto, Hiroshima (JP); Yuji Shiwa, Hiroshima (JP); Yuya Ishihara, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 199 days.

(21) Appl. No.: 14/314,252

(22) Filed: Jun. 25, 2014

(65) Prior Publication Data

US 2015/0000445 A1    Jan. 1, 2015

(30) Foreign Application Priority Data

Jun. 26, 2013    (JP) ................... 2013-133596

(51) Int. Cl.
*F16H 59/08*      (2006.01)
*F16H 59/10*      (2006.01)
*F16H 59/02*      (2006.01)

(52) U.S. Cl.
CPC ......... *F16H 59/10* (2013.01); *F16H 59/0204* (2013.01); *F16H 59/0208* (2013.01); *F16H 2059/026* (2013.01); *F16H 2059/0265* (2013.01); *F16H 2059/0282* (2013.01); *Y10T 74/2014* (2015.01)

(58) Field of Classification Search
CPC ................ F16H 59/10; F16H 59/0208; F16H 2059/0265; F16H 2059/026
USPC ............ 403/226; 74/473.29, 473.25, 473.24
See application file for complete search history.

(56) References Cited

U.S. PATENT DOCUMENTS 5,862,708 A    1/1999   Shamoto
8,240,229 B2 *  8/2012   Matsuba .............. F16H 59/04
                                                    74/473.24
(Continued)

FOREIGN PATENT DOCUMENTS

DE    19908101         5/2000
DE    19908101 C1 *    5/2000   ............ B60K 20/04
(Continued)

OTHER PUBLICATIONS

European Patent Application No. 14 173 630.6 Search Report—Nov. 5, 2014.

*Primary Examiner* — Terence Boes
*Assistant Examiner* — Randell J Krug
(74) *Attorney, Agent, or Firm* — Gerald E. Hespos; Michael J. Porco; Matthew T. Hespos (57) ABSTRACT

Disclosed is an automatic transmission shifter which comprises a shifter body, and a shift lever. The shifter body comprises a housing having a gate, and a lever contact noise-preventing element. The shift lever comprises a lever shaft and a locking piece. The lever contact noise-preventing element comprises a shaft contact noise-preventing portion configured to prevent contact noise between the lever shaft penetrating the gate and the shifter body, and a locking piece contact noise-preventing portion integrally formed with the shaft contact noise-preventing portion and configured to prevent contact noise between the locking piece and the shifter body. The housing and the lever contact noise-preventing element are formed by a double molding process.

3 Claims, 9 Drawing Sheets

(56) References Cited

U.S. PATENT DOCUMENTS

| | | | | |
|---|---|---|---|---|
| 2001/0006719 A1* | 7/2001 | Krimm | ................... | F16H 59/10 |
| | | | | 428/194 |
| 2002/0020242 A1* | 2/2002 | Matsuno | ............ | F16H 59/0208 |
| | | | | 74/473.3 |
| 2008/0083294 A1* | 4/2008 | Gorman | .................. | F16H 59/10 |
| | | | | 74/473.25 |
| 2009/0165590 A1* | 7/2009 | Sugiyama | ........... | F16H 59/0208 |
| | | | | 74/473.21 |
| 2010/0257970 A1* | 10/2010 | Giefer | ................ | F16H 59/0204 |
| | | | | 74/473.21 |
| 2010/0307277 A1* | 12/2010 | Ueta | ................... | F16H 59/0204 |
| | | | | 74/473.34 |
| 2011/0036193 A1* | 2/2011 | Ueta | ................... | F16H 59/0204 |
| | | | | 74/473.21 |
| 2012/0103122 A1* | 5/2012 | Morrissett | ............... | F16H 59/10 |
| | | | | 74/473.25 |

FOREIGN PATENT DOCUMENTS

| | | | | |
|---|---|---|---|---|
| DE | 29914984 | * | 8/2001 | ............ B60K 20/02 |
| GB | 2339864 A | | 9/2000 | |
| JP | 08200482 | | 8/1996 | |
| JP | 10-024748 | | 1/1998 | |
| JP | 10024748 | | 1/1998 | |
| JP | 2000153722 | | 6/2000 | |
| SE | EP 2733390 A1 | * | 5/2014 | ......... F16H 59/0208 |

\* cited by examiner

AUTOMATIC TRANSMISSION SHIFTER

TECHNICAL FIELD

The present invention relates to a shifter for an automatic transmission usable in a vehicle such as an automotive vehicle.

BACKGROUND ART

Heretofore, there has been widely known an automatic transmission shifter which comprises a shifter body, and a shift lever held by the shifter body. This automatic transmission shifter includes a type in which an automatic-shift-mode gate is provided to extend approximately linearly in a shift direction (vehicle front-rear direction) so as to allow a shift lever to be moved therealong in an automatic shift mode. Concerning this type, there has been proposed a mechanism which comprises a locking piece provided in the shift lever, wherein the locking piece is configured to be entered into a locking piece-receiving recess according to a biasing spring to thereby allow a lever shaft provided in the shift lever to be positioned and locked in each range in the automatic-shift-mode gate. However, in this mechanism, when the locking piece is entered into the locking piece-receiving recess, the locking piece is brought into contact with an internal wall surface defining the locking piece-receiving recess, which is likely to cause loud noise.

Therefore, there has been proposed a technique in which a locking piece contact noise-preventing element made of a soft synthetic resin material is provided to protrude inward of the internal wall surface defining the locking piece-receiving recess, whereby the locking piece is brought into contact with the locking piece contact noise-preventing element when it is entered into the locking piece-receiving recess, thereby suppressing contact noise, as disclosed, for example, in JP 2000-153722A.

Examples of the above automatic transmission shifter also include a type in which, in addition to the automatic-shift-mode gate, a manual-shift-mode gate configured to allow the shift lever to be moved therealong in a manual shift mode is provided in such a manner as to be communicated with the automatic-shift-mode gate via a communication passage extending in a select direction (vehicle width direction) perpendicular to the shift direction, as disclosed, for example, in JP 10-24748A. Specifically, as means for suppressing noise which is caused when the shift lever is moved from the automatic-shift-mode gate into the manual-shift-mode gate or from the manual-shift-mode gate into the automatic-shift-mode gate, and thus brought into contact with an inner peripheral wall of the manual-shift-mode gate or the automatic-shift-mode gate, the JP 10-24748A discloses a technique of covering, by a cushioning cap, a pin provided on the shift lever and configured to be brought into contact with inner peripheral wall of the gate.

However, for example, in this type of automatic transmission shifter, wherein the automatic-shift-mode gate is provided to extend approximately linearly in the shift direction, and the manual-shift-mode gate is provided in such a manner as to be communicated with the automatic-shift-mode gate via the communication passage extending in the select direction, it is necessary to arrange, in position, the locking piece contact noise-preventing element made of a soft synthetic resin material, and further install the cushioning cap to cover the pin provided on the shift lever. This leads to increases in the number of components and a time required for a shifter assembling process, resulting in an increased production cost.

SUMMARY OF THE INVENTION

It is therefore an object of the present invention to provide an automatic transmission shifter having a lever contact noise-preventing element capable of avoiding an increase in the number of components and simplifying a shifter assembling process to allow the automatic transmission shifter to be produced at low cost.

In order to achieve the above object, the present invention provides an automatic transmission shifter comprising a shifter body, and a shift lever movably held by the shifter body, wherein: the shifter body comprises a housing, and a lever contact noise-preventing element for preventing contact noise between the shifter body and the shift lever; and the shift lever comprises a lever shaft, and a locking piece provided to protrude from the lever shaft and configured to allow the lever shaft to be releasably locked with respect to the shifter body, and wherein: the housing comprises a gate movably penetrated by the lever shaft; and the lever contact noise-preventing element comprises a shaft contact noise-preventing portion configured to prevent contact noise between the lever shaft penetrating the gate and the shifter body, and a locking piece contact noise-preventing portion configured to prevent contact noise between the locking piece and the shifter body, and wherein: the shaft contact noise-preventing portion is provided inward of an inner peripheral wall of the gate in such a manner as to be interposed between the inner peripheral wall and the lever shaft; the locking piece contact noise-preventing portion is provided to be contactable with the locking piece; the shaft contact noise-preventing portion and the locking piece contact noise-preventing portion are integrally formed, each using a soft material having a hardness less than that of the housing; and the housing and the lever contact noise-preventing element are integrally formed.

The automatic transmission shifter of the present invention can have a lever contact noise-preventing element capable of avoiding an increase in the number of components and simplifying a shifter assembling process to allow the automatic transmission shifter to be produced at low cost.

DESCRIPTION OF EMBODIMENTS

Figure 1:
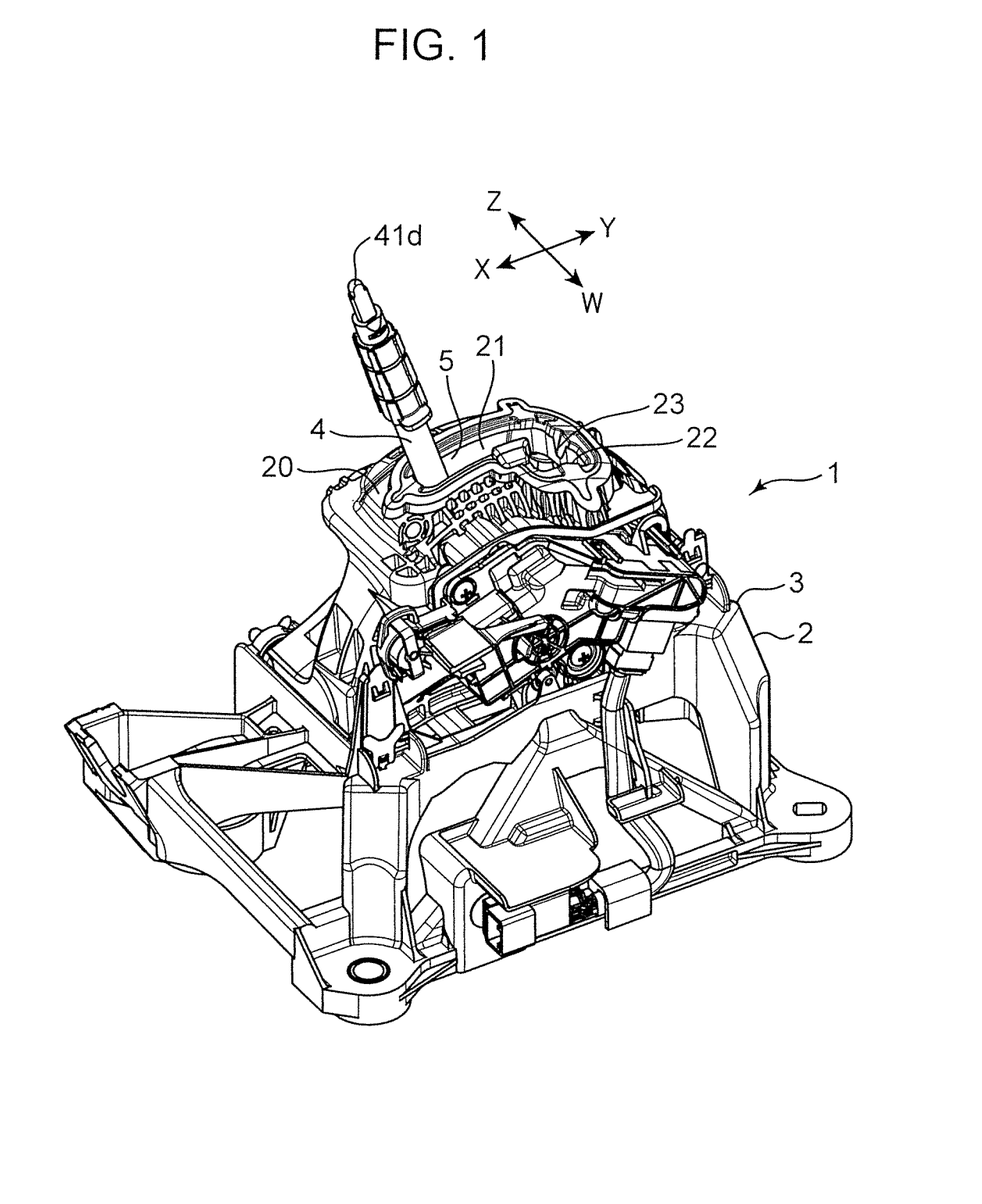
FIG. 1 is a perspective view of an automatic transmission shifter according to one embodiment of the present invention.
Figure 2:
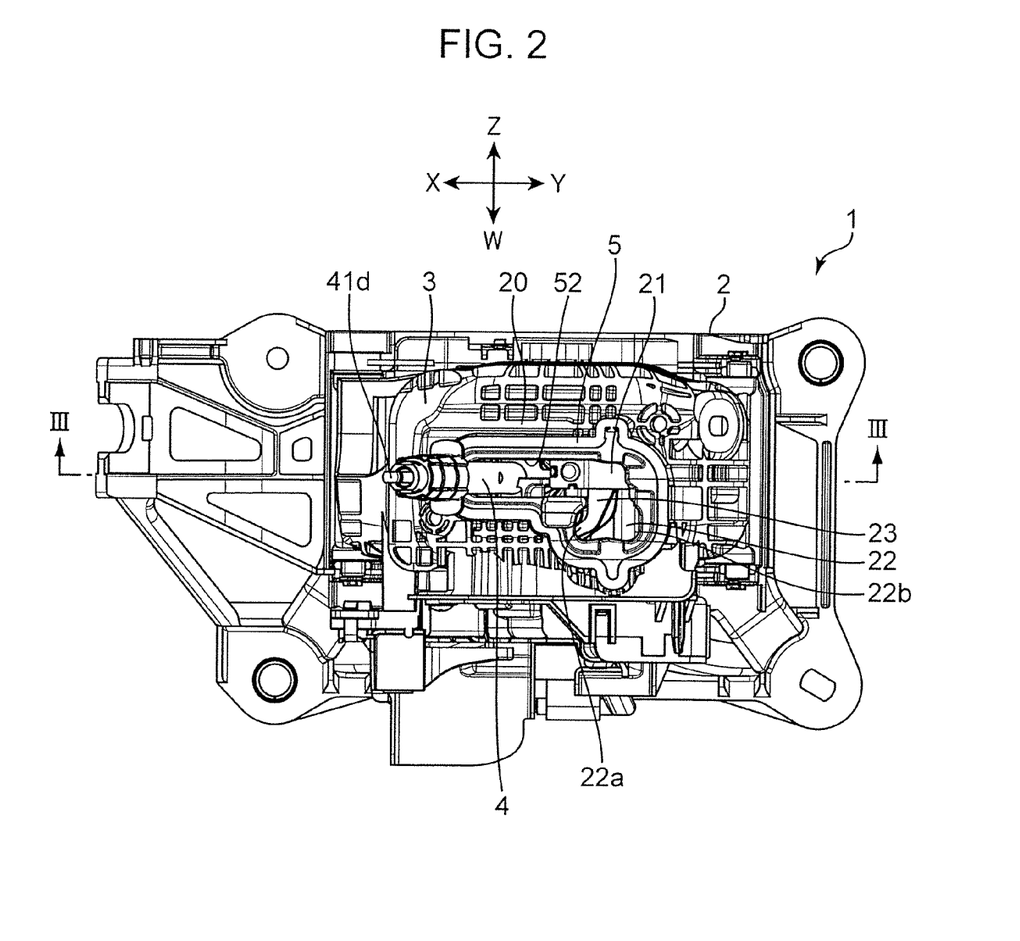
FIG. 2 is a top plan view of the automatic transmission shifter in FIG. 1.
Figure 3:
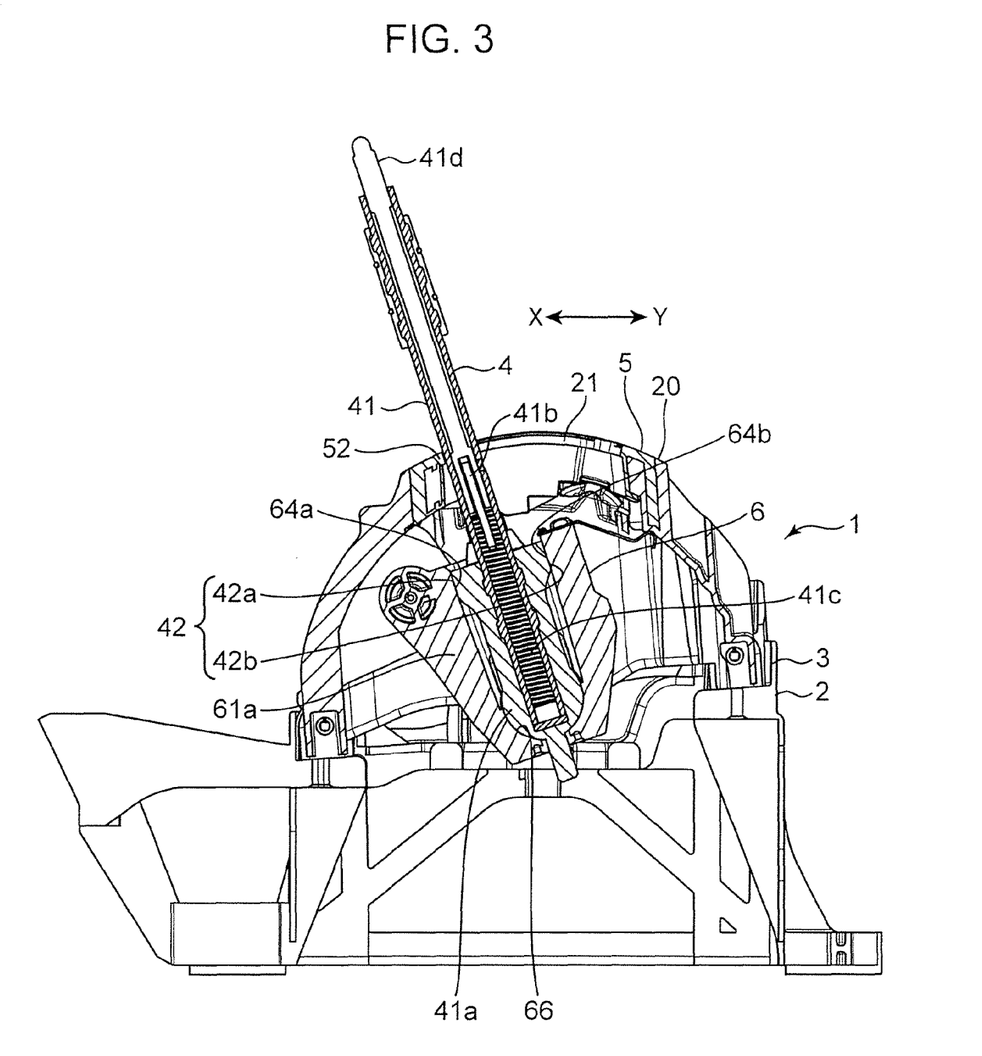
FIG. 3 is a sectional view taken along the line III-III in FIG. 2.
Figure 4:
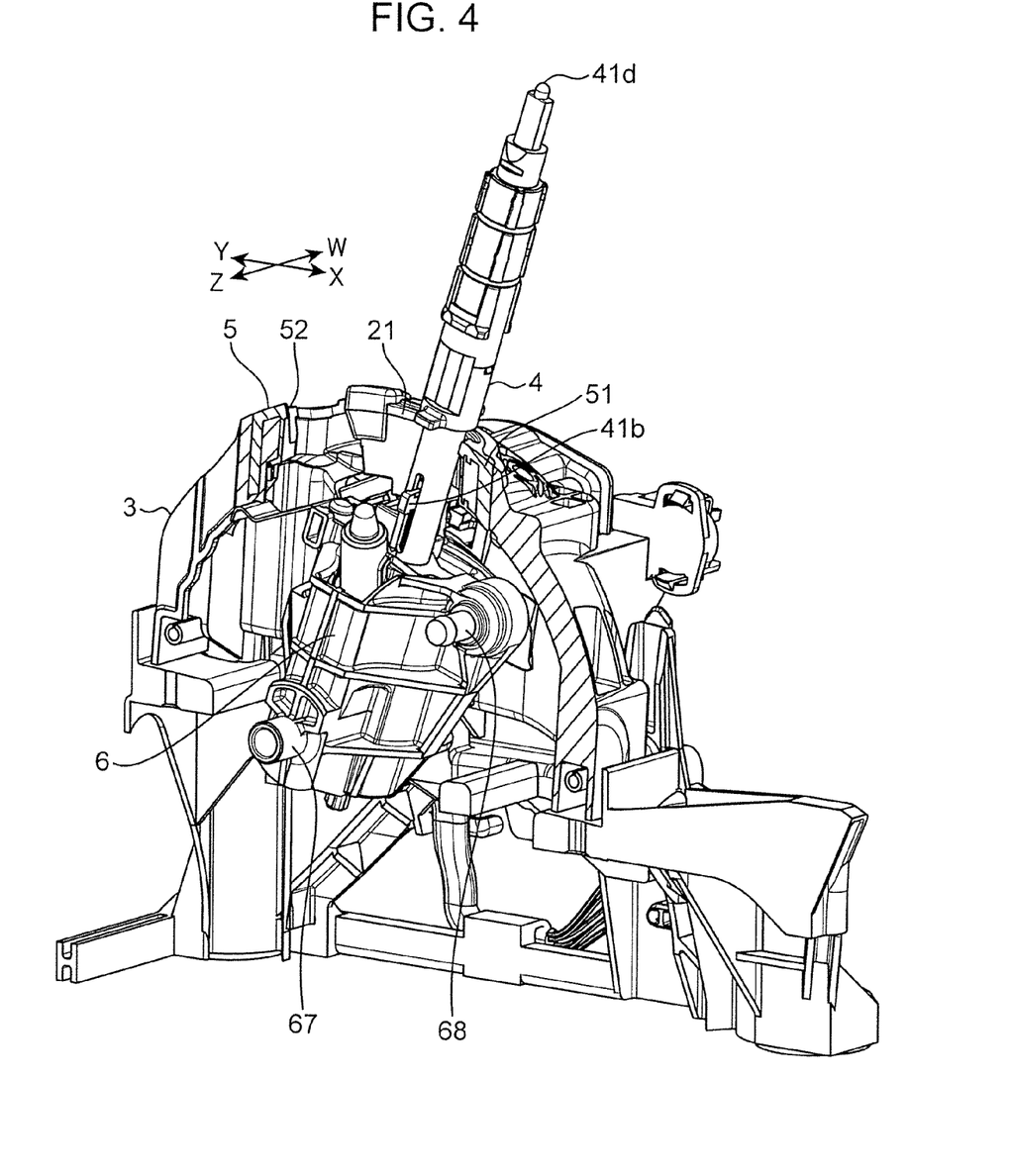
FIG. 4 is a partially-sectional perspective view of the automatic transmission shifter in FIG. 1.

With reference to the drawings, the present invention will now be described in detail, based on an embodiment thereof. FIG. 1 and FIG. 2 are, respectively, a perspective view and a top plan view of an automatic transmission shifter according to one embodiment of the present invention, and FIG. 3 is a sectional view taken along the line III-III in FIG. 2, wherein the direction X and the direction Y indicate a front direction and a rear direction, respectively, and the direction Z and the direction W indicate a right direction and a left direction, respectively.

The automatic transmission shifter 1 according to this embodiment is designed for an automotive vehicle, and comprises a shifter body 2 configured to be fixed to a vehicle body, and a shift lever 4 held by the shifter body 2, as illustrated in FIGS. 1 and 2.

The shifter body 2 comprises a housing 3, a lever contact noise-preventing element 5 for preventing contact noise between the housing 3 and the shift lever 4, and an automatic transmission-manipulating member 6 (see FIG. 3) swingably coupled to the housing 3.

In this embodiment, the housing 3 is made of a polyamide-based synthetic resin, wherein a top wall 20 thereof has a gate 21 to 23 formed to penetrate between an outer surface and an inner surface thereof.

The gate in this embodiment comprises an automatic-shift-mode gate 21, a manual-shift-mode gate 22, and a communication passage 23 provided between the automatic-shift-mode gate 21 and the manual-shift-mode gate 22 to communicate therebetween.

The automatic-shift-mode gate 21 is configured to allow the shift lever 4 to be moved therealong in an automatic shift mode, i.e., in a coupled state in which the automatic transmission-manipulating member 6 and the shift lever 4 are coupled together. The automatic-shift-mode gate 21 is provided to linearly extend in a shift direction (front rear direction).

The manual-shift-mode gate 22 is configured to allow the shift lever 4 to be moved therealong in a manual shift mode, i.e., in a coupling-released state in which the coupling between the automatic transmission-manipulating member 6 and the shift lever 4 is released. The manual-shift-mode gate 22 is provided on a left side of the automatic-shift-mode gate 21 and parallel to the automatic-shift-mode gate 21.

The communication passage 23 is provided to extend in a select direction (right-left direction, i.e., vehicle width direction) so as to communicate between a rear region of the automatic-shift-mode gate 21 and a front-rear directional central region of the manual-shift-mode gate 22.

Although not illustrated, a cover is provided on an upper surface of the top wall 20 in such a manner as to be superimposed thereon from thereabove. This cover is composed of a plate-like member having a set of gate-equivalent holes each having approximately the same shape as a respective one of the gates 21 to 23 of the top wall 20. The cover has an indication area indicating various ranges set for the automatic-shift-mode gate, beside the automatic-shift-mode gate-equivalent holes.

Specifically, alphabets "P", "R", "N" and "D" are indicated on the indication area at respective positions corresponding to "parking range", "reverse range" "neutral range" and "drive range, which are set for the automatic-shift-mode gate in this order in a front-to-rear direction.

Figure 7:
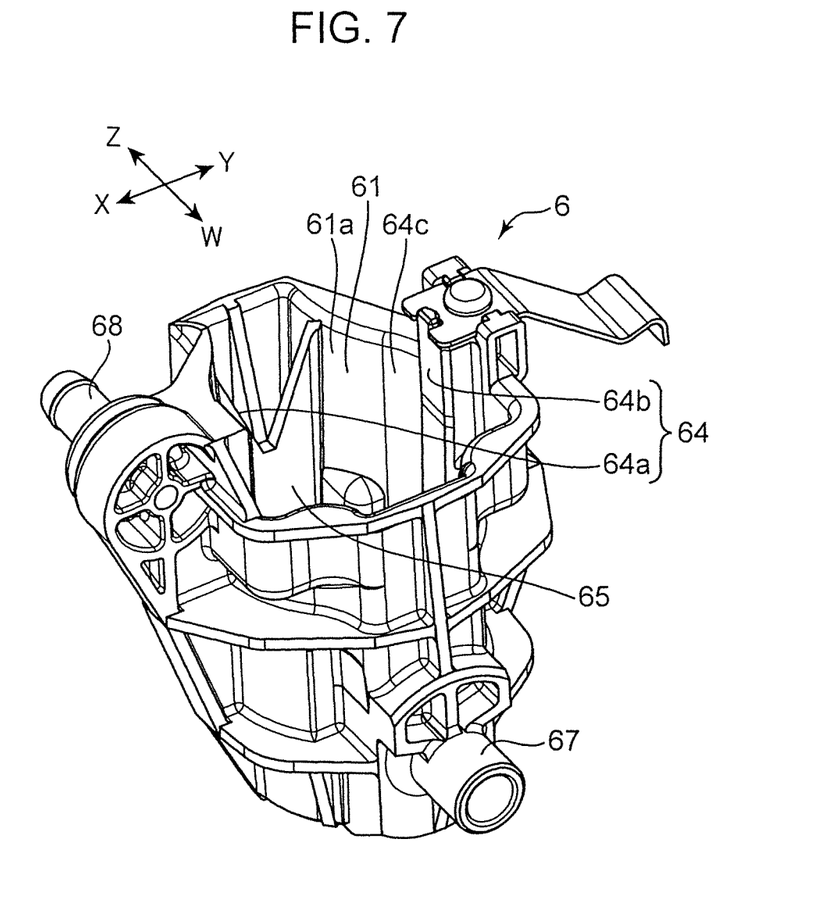
FIG. 7 is a perspective view of an automatic transmission-manipulating member in the automatic transmission shifter in FIG. 1.
Figure 8:
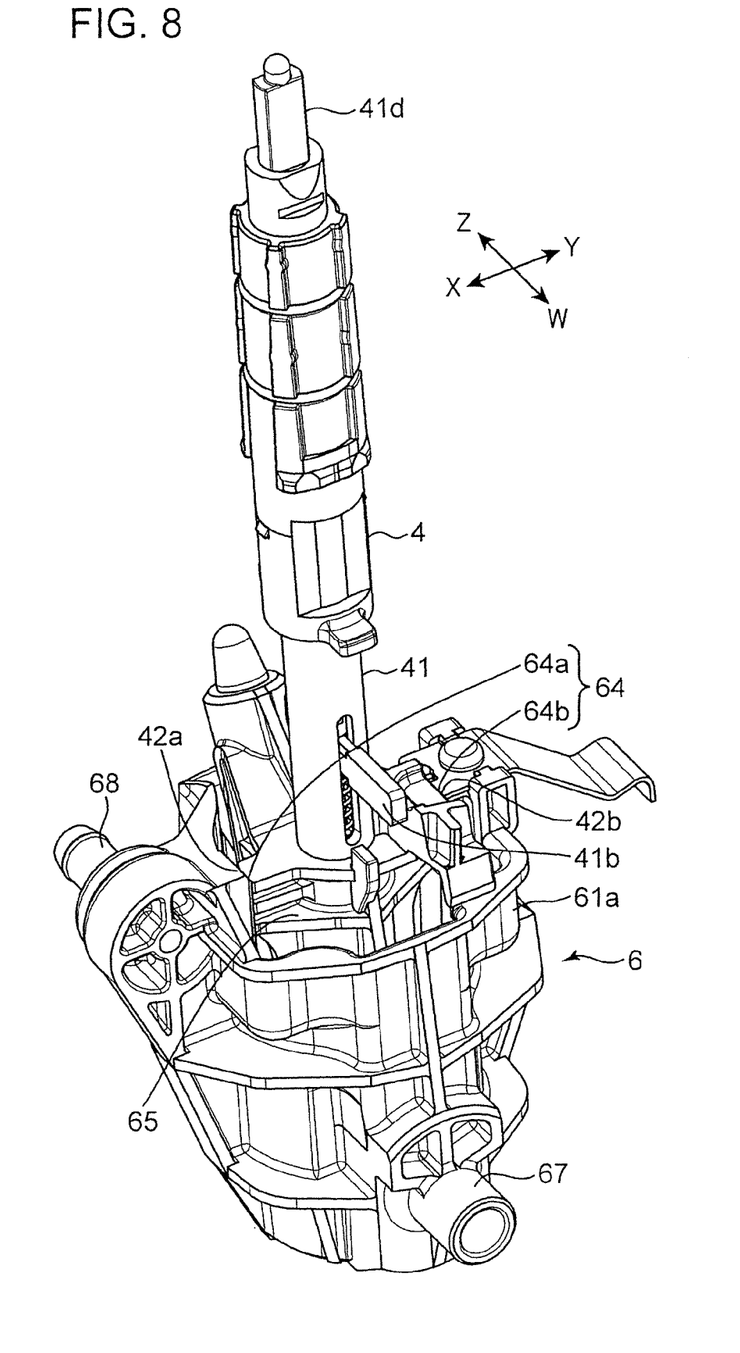
FIG. 8 is a perspective view of the automatic transmission-manipulating member and the shift lever, wherein a manipulation member-coupling portion of the shift lever is coupled to a lever-coupling portion of the automatic transmission-manipulating member.
Figure 9:
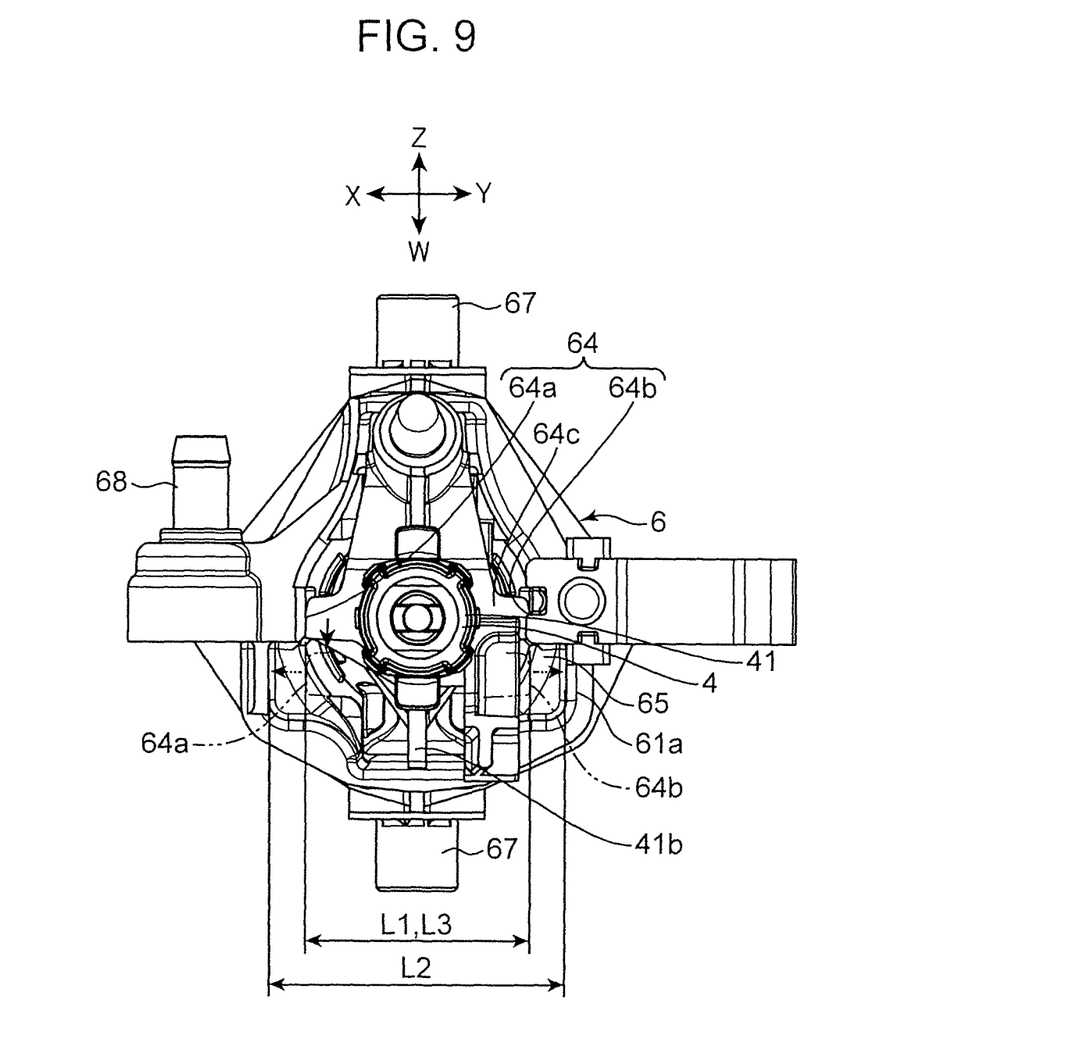
FIG. 9 is a top plan view of the automatic transmission-manipulating member and the shift lever in FIG. 8.

In this embodiment, as illustrated in FIGS. 7 to 9, the automatic transmission-manipulating member 6 comprises a receiving section 61 which receives therein an aftermentioned manipulating member-coupling portion 42 of the shift lever 4.

The receiving section 61 has a peripheral wall 61a opened upwardly. The peripheral wall 61a has an upper portion formed to surround the aftermentioned manipulating member-coupling portion 42 around the entire circumference thereof, and an inner periphery of the upper portion comprises a lever-coupling portion 64 configured to be coupled and decoupled with respect to the aftermentioned manipulating member-coupling portion 42, and a lever loose-fitting portion 65 configured to allow the aftermentioned manipulating member-coupling portion 42 to be loosely fitted thereinto.

The lever-coupling portion 64 comprises a first lever-coupling sub-portion 64a and a second lever-coupling sub-portion 64b which are opposed to each other in the shift direction. The first lever-coupling sub-portion 64a and the second lever-coupling sub-portion 64b are formed to be located in opposed and spaced-apart relation to each other in the shift direction by a distance L1 (illustrated in FIG. 9), thereby defining therebetween a lever fit-insertion space 64c for allowing the aftermentioned manipulating member-coupling portion 42 to be fittingly inserted thereinto.

The lever loose-fitting portion 65 is formed to be communicated with the lever fit-insertion space 64c of the lever-coupling portion 64. The lever loose-fitting portion 65 is formed on a left side of the lever-coupling portion 64 (on one side of the lever-coupling portion 64 in the select direction). The aftermentioned manipulating member-coupling portion 42 is configured to be movable between the lever coupling portion 64 and the lever loose-fitting portion 65.

The lever loose-fitting portion 65 is formed such that an interspace distance L2 thereof in the shift direction is greater than the distance L1 of the lever fit-insertion space 64c so as to allow the aftermentioned manipulating member-coupling portion 42 to be moved in the shift direction (when it is loosely fitted therein).

As illustrated in FIG. 3, the peripheral wall 61a has a lower portion formed in a shape which gradually shrinks downwardly, and comprises a hemispherical-shaped lever holding portion 66 provided in an inner periphery of an lower end thereof and configured to swingably hold the shift lever 4.

As illustrated in FIGS. 4 and 7 to 9, the automatic transmission-manipulating member 6 has a pair of pivot shafts 67 provided, respectively, on right and left sides of the lower end to protrude outwardly from an outer peripheral surface of the lower end.

The automatic transmission-manipulating member 6 further comprises an automatic transmission-coupling portion 68 provided on an outer periphery of the upper portion of the peripheral wall 61a, and a non-illustrated automatic transmission provided in the vehicle is coupled to the automatic transmission-coupling portion 68 via a non-illustrated coupling member.

The automatic transmission-manipulating member 6 formed as above is provided inside the housing 3 in such a manner that the pivot shafts 67 are pivotally supported by the housing 3 in a swingable manner in the shift direction. Thus, the automatic transmission-manipulating member 6 is swingably moved with respect to the housing 3 in the shift direction about the pivot shafts 67 to manipulate the automatic transmission.

The lever contact noise-preventing element 5 comprises an element body 51 which has an upper portion formed as a shaft contact noise-preventing portion 52 configured to prevent contact noise between an aftermentioned lever shaft 41 of the shift lever 4 and the shifter body 2, and a lower end formed as a locking piece contact noise-preventing portion 53 configured to prevent contact noise between an aftermentioned locking piece 41b of the shift lever 4 and the shifter body 2.

The element body 51 is made of a soft material having a hardness less than that of the housing 3, and formed in a hollow cylindrical shape. In this embodiment, the element body 51 is made of an elastic elastomer.

The upper portion of the element body 51 comprises a gate-covering portion formed to cover respective inner peripheral walls of the automatic-shift-mode gate 21, the manual-shift-mode gate 22 and the communication passage 23. The element body 51 has a bottom edge surface which is concaved to define a plurality of locking piece-receiving recesses 54.

The gate-covering portion constitutes the shaft contact noise-preventing portion 52, and a lever insertion hole 52a is defined inward of the shaft contact noise-preventing portion 52. The lever insertion hole 52a is formed in approximately the same size as that of each of the gates 21 to 23.

Figure 5:
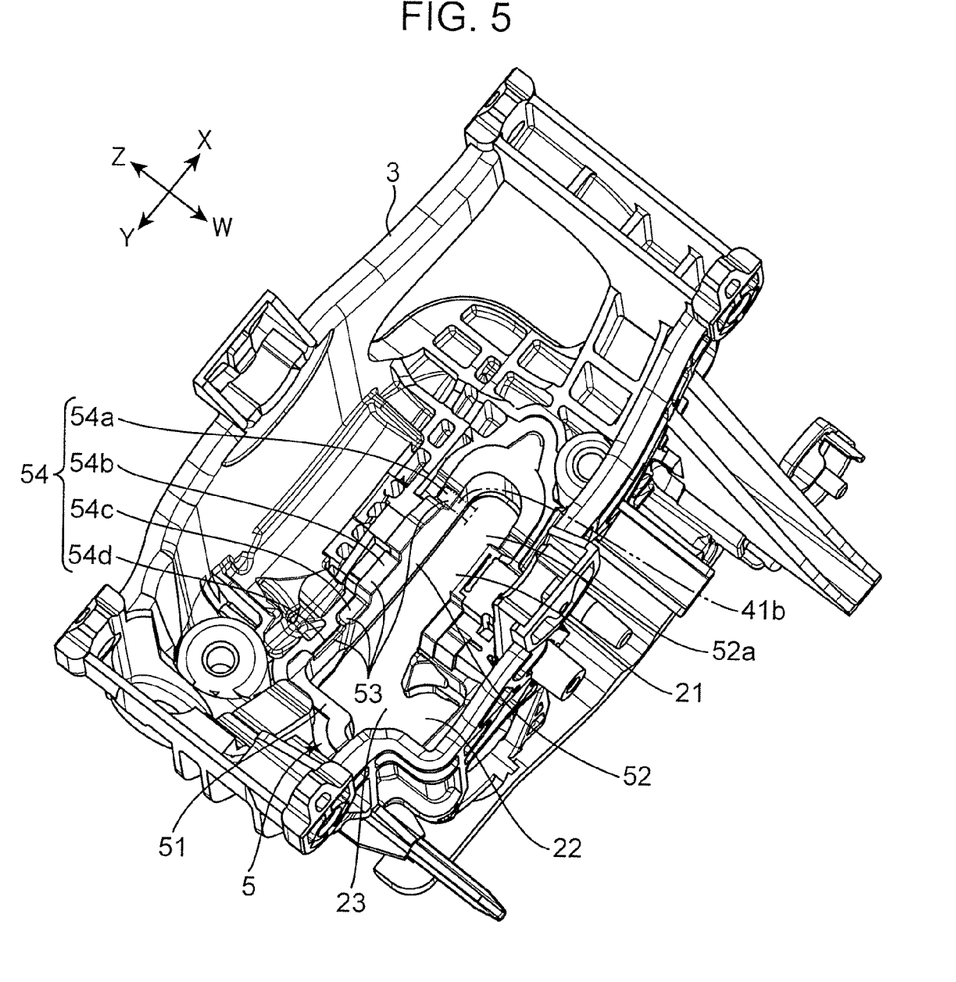
FIG. 5 is a perspective bottom view of the automatic transmission shifter in FIG. 1, wherein a housing and a lever contact noise-preventing element of a shifter body are formed by a double molding process.

As illustrated in FIG. 5, the locking piece-receiving recesses 54 comprise a parking range-locking recess 54a, a reverse range-locking recess 54b, a neutral range-locking recess 54c and a drive range-locking recess 54d, which are arranged in this order in the front-to-rear direction.

The parking range-locking recess 54a, the reverse range-locking recess 54b, the neutral range-locking recess 54c and the drive range-locking recess 54d are configured to receive and lock the aftermentioned locking piece 41b of the shift lever 4, respectively, in the parking range, the reverse range, the neutral range and the drive range.

The locking piece contact noise-preventing portion 53 is formed in the surface portion of a plurality of recess-defining walls of the element body 51, each of which defines a respective one of the parking range-locking recess 54a, the reverse range-locking recess 54b, the neutral range-locking recess 54c and the drive range-locking recess 54d.

The lever contact noise-preventing element 5 configured as above is installed in such a manner that the shaft contact noise-preventing portion 52 is fittingly inserted into the gates 21 to 23.

In this embodiment, the housing 3 and the lever contact noise-preventing element 5 are integrally formed by a double molding process of molding different materials in combination and integrally.

Specifically, a polyamide-based synthetic resin as a primary material is poured into a mold to form a housing 3 as a primary product. Then, in a state in which the formed housing 3 is left on the same core, a polyamide-based synthetic resin as a secondary material is poured into a secondary cavity to form a lever contact noise-preventing element 5 integrally with the housing 3.

This makes it possible to easily form the housing 3 and the lever contact noise-preventing element 5 in an assembled manner, while forming the housing 3 and the lever contact noise-preventing element 5 in a single piece, thereby minimizing the number of components.

Figure 6:
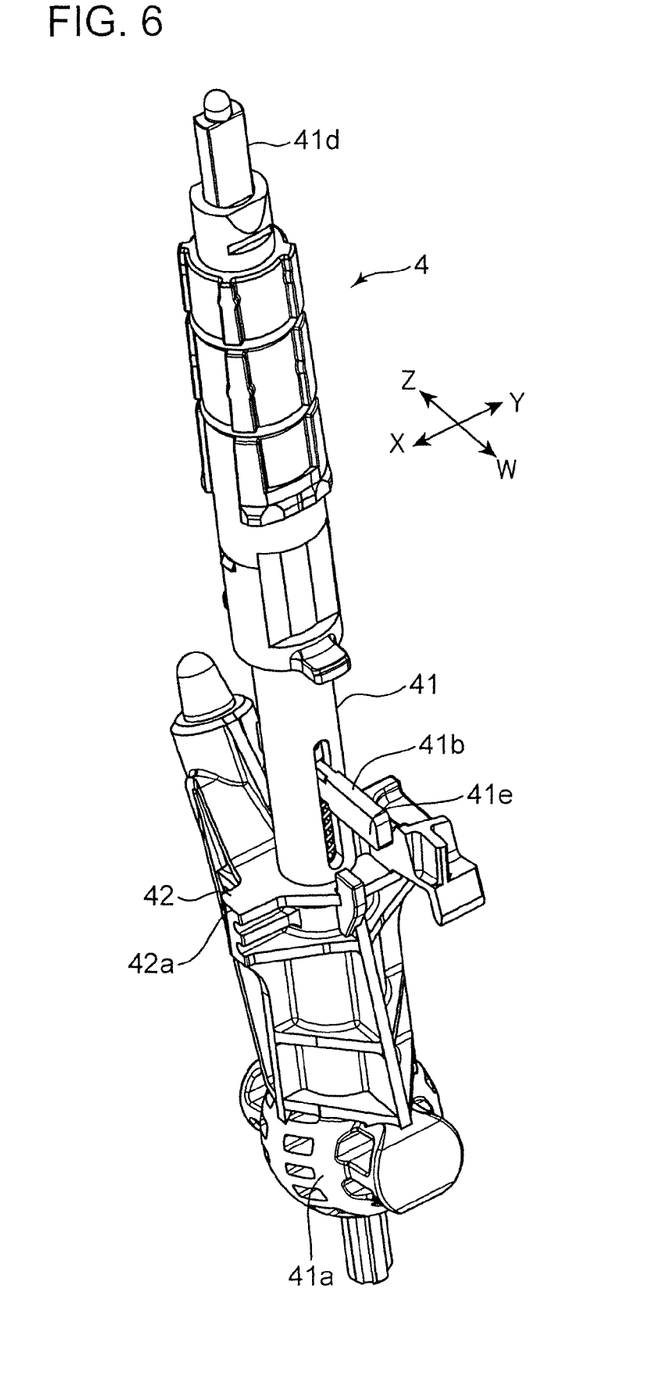
FIG. 6 is a perspective view of a shift lever in the automatic transmission shifter in FIG. 1.

As illustrated in FIGS. 3 and 6, the shift lever 4 comprises a lever shaft 41, a locking piece 41b attached to the lever shaft 41, and a manipulating member-coupling portion 42 capable of being coupled and decoupled with respect to the automatic transmission-manipulating member 6.

The lever shaft 41 has an upper distal end to which a non-illustrated operating grip member is attached. A driver or the like can manually grip and operate the attached operating grip member to manually operate the lever shaft 41.

The lever shaft 41 has a lower (in FIGS. 3 and 6) base end formed as a spherical-shaped portion 41a made of a synthetic resin.

The locking piece 41b is provided as a means to allow the lever shaft 41 to be releasably locked in each of the ranges of the automatic-shift-mode gate 21 in the shifter body 2. The locking piece 41b has a protruding portion 41e protruding leftwardly from an outer periphery of the lever shaft 41.

The locking piece 41b is held movably with respect to the lever shaft 41 along an axial direction extending approximately in an up-down direction. The locking piece 41b is biased upwardly by a coil spring 41c provided inside the lever shaft 41. According to a biasing force of the coil spring 41c, the locking piece 41b is entered into and locked in one of the parking range-locking recess 54a, the reverse range-locking recess 54b, the neutral range-locking recess 54c and the drive range-locking recess 54d, correspondingly to a desired one of the ranges.

Then, when a pushing operation member 41d provided at an upper end of the lever shaft 41 is manually pushed downwardly against the biasing force of the coil spring 41c, the locking piece 41b is moved downwardly out of the locking piece-receiving recesses 54, to allow the lever shaft 41 to be moved along the automatic-shift-mode gate 21.

The manipulating member-coupling portion 42 comprises a first manipulation member-coupling sub-portion 42a configured to be coupled and decoupled with respect to the first lever-coupling sub-portion 64a, and a second manipulation member-coupling sub-portion 42b configured to be coupled and decoupled with respect to the second lever-coupling sub-portion 64b.

The first manipulation member-coupling sub-portion 42a is formed to protrude forwardly from the outer periphery of the lever shaft 41.

The second manipulation member-coupling sub-portion 42b is formed behind the lever shaft 41, i.e., on a side opposite to the first manipulation member-coupling sub-portion 42a across the lever shaft 41, to protrude rearwardly from the outer periphery of the lever shaft 41.

As illustrated in FIG. 9, a distance L3 between the first manipulation member-coupling sub-portion 42a and the second manipulation member-coupling sub-portion 42b is set to be approximately equal to the distance L1 between the first lever-coupling sub-portion 64a and the second lever-coupling sub-portion 64b, so as to allow the manipulating member-coupling portion 42 to be fittingly inserted into the lever fit-insertion space 64c approximately without any gap.

Further, the distance L3 is less than the interspace distance L2 of the lever loose-fitting portion 65, so that the manipulating member-coupling portion 42 can be moved within the lever loose-fitting portion 65 in the shift direction.

As illustrated in FIG. 3, the shift lever 4 configured as above is inserted into the receiving section 61 of the automatic transmission-manipulating member 6 from thereabove, and held with respect to the lever holding portion 66 in a swingable manner in the shift and select directions, so that the upper end of the lever shaft 41 can be swingingly moved in the front-rear and right-left directions about the spherical-shaped portion 41a serving as a pivot.

Then, in the state in which the spherical-shaped portion 41a is held by the lever holding portion 66, the lever shaft 41 is penetratingly inserted into the lever insertion hole 52a of the element body 51 to allow an axial direction thereof to extend approximately along the up-down direction.

In this state, the locking piece 41b is disposed beneath the locking piece contact noise-preventing portion 53, and kept in contact with the locking piece contact noise-preventing portion 53 while being always pushed upwardly by the biasing force of the coil spring 41c, thereby being locked in the locking piece contact noise-preventing portion 53.

For example, when the locking piece 41b is set in the parking range-locking recess 54a, the lever shaft 41 is positioned in the parking (P) range set on the frontmost side of the automatic-shift-mode gate 21. Further, when the locking piece 41b is set in the reverse range-locking recess 54b, the lever shaft 41 is positioned in the reverse range set on the second frontmost side of the automatic-shift-mode gate 21.

Further, when the locking piece 41b is set in the neutral range-locking recess 54c, the lever shaft 41 is positioned in the neutral range, and, when the locking piece 41b is set in the drive range-locking recess 54d, the lever shaft 41 is positioned in the drive range.

An operation of the automatic transmission shifter according to the above embodiment will be described below. For example, in the state in which the locking piece 41b of the shift lever 4 is set in the parking range-locking recess 54a (see FIG. 5), upon pushing operation of the pushing operation member 41d of the shift lever 4, the locking piece 41b is moved downwardly against the biasing force of the coil spring 41c, to a position beneath the locking piece-receiving recesses 54.

Then, in this state, when the operating grip member of the shift lever 4 is manually pushed rearwardly, the locking piece 41b is moved to a position beneath the reverse range-locking recess 54b, or to a position beneath the neutral range-locking recess 54c or the drive range-locking recess 54d after passing through the position beneath the reverse range-locking recess 54b.

In this state, when the pushing operation of the pushing operation member 41d is stopped, the locking piece 41b is entered into one of the reverse range-locking recess 54b, the neutral range-locking recess 54c and the drive range-locking recess 54d, according to the biasing force of the coil spring 41c, and brought into contact with the locking piece contact noise-preventing portion 53.

In this situation, the locking piece contact noise-preventing portion 53 made of a soft material prevents contact noise between the locking piece 41b and the locking piece contact noise-preventing portion 53.

On the other hand, in the state in which the locking piece 41b is set in one of the reverse range-locking recess 54b, the neutral range-locking recess 54c and the drive range-locking recess 54d, for example, set in the neutral range-locking recess 54c, when the pushing operation member 41d is manually pushed, and the shift lever 4 is manually pushed forwardly, the locking piece 41b is moved to the position beneath the reverse range-locking recess 54b or the parking range-locking recess 54a.

Then, in this state, when the pushing operation of the pushing operation member 41d is stopped, the locking piece 41b is entered into the reverse range-locking recess 54b or the parking range-locking recess 54a, according to the biasing force of the coil spring 41c, and brought into contact with the locking piece contact noise-preventing portion 53. In this situation, the locking piece contact noise-preventing portion 53 also prevents contact noise between the locking piece 41b and the locking piece contact noise-preventing portion 53.

Further when the lever shaft 41 is moved along the automatic-shift-mode gate 21, for example, moved from the reverse range to the parking range, a portion of the shaft contact noise-preventing portion 52 interposed between the inner peripheral wall of the automatic-shift-mode gate 21 and the lever shaft 41 can prevent a situation where loud noise is generated by a contact between the lever shaft 41 and the automatic-shift-mode gate 21.

On the other hand, in the state in which the locking piece 41b is set in the drive range-locking recess 54d, when the lever shaft 41 is pushed leftwardly, the lever shaft 41 is moved into the communication passage 23 and then moved into the manual-shift-mode gate 22 from the communication passage 23.

In this situation, the shaft contact noise-preventing portion 52 made of a soft material and provided on a lateral portion of the manual-shift-mode gate 22 suppresses contact noise between the locking piece 41b and the shaft contact noise-preventing portion 52 even when the lever shaft 41 is strongly pushed and brought into contact with the lateral portion of the manual-shift-mode gate 22 by a strong force.

When the lever shaft 41 is moved into the manual-shift-mode gate 22, the manipulating member-coupling portion 42 is moved from the lever fit-insertion space 64c of the automatic transmission-manipulating member 6 into the lever loose-fitting portion 65, and the coupling between the shift lever 4 and the automatic transmission-manipulating member 6 is released. In this state, the automatic transmission is maintained in a drive state, and set to the manual shift mode.

In this embodiment, when the lever shaft 41 is moved into the communication passage 23, a non-illustrated manual shift mode detection device installed in the shifter body 2 detects that the manual shift mode is selected. Then, when the lever shaft 41 is moved to a minus gate 22a of the manual-shift-mode gate 22, a non-illustrated detection device installed in the shifter body 2 detects the movement, and a control unit provided on the shifter body 2 operates to perform a shift-down action once based on the detection result.

On the other hand, when the lever shaft 41 is moved to a plus gate 22b of the manual-shift-mode gate 22, the detection device detects the movement, and the control unit operates to perform a shift-up action once based on the detection result.

Subsequently, when the lever shaft 41 of the shift lever 4 is returned from the manual-shift-mode gate 22 to the drive range of the automatic-shift-mode gate 21 through the communication passage 23, the manipulating member-coupling portion 42 of the shift lever 4 is re-fitted into the lever fit-insertion space 64c from the lever loose-fitting portion 65 of the automatic transmission-manipulating member 6, so that the coupling between the shift lever 4 and the automatic transmission-manipulating member 6 is re-established.

<Outline of Embodiment>

Last of all, features of the automatic transmission shifter disclosed in the above embodiment and functions/advantages based on the features will be outlined below.

The automatic transmission shifter according to the above embodiment comprises a shifter body, and a shift lever movably held by the shifter body, wherein: the shifter body comprises a housing, and a lever contact noise-preventing element for preventing contact noise between the shifter body and the shift lever; and the shift lever comprises a lever shaft, and a locking piece provided to protrude from the lever shaft and configured to allow the lever shaft to be releasably locked with respect to the shifter body, and wherein: the housing comprises a gate movably penetrated by the lever shaft; and the lever contact noise-preventing element comprises a shaft contact noise-preventing portion configured to prevent contact noise between the lever shaft penetrating the gate and the shifter body, and a locking piece contact noise-preventing portion configured to prevent contact noise between the locking piece and the shifter body, and wherein: the shaft contact noise-preventing portion is provided inward of an inner peripheral wall of the gate in such a manner as to be interposed between the inner peripheral wall and the lever shaft; the locking piece contact noise-preventing portion is provided to be contactable with the locking piece; the shaft contact noise-preventing portion and the locking piece contact noise-preventing portion are integrally formed, each using a soft material having a hardness less than that of the housing; and the housing and the lever contact noise-preventing element are integrally formed.

In this automatic transmission shifter, for example, the shaft contact noise-preventing portion and the locking piece contact noise-preventing portion can be integrally formed using a soft material having a hardness less than that of the housing, and, in a process of forming the housing, the housing can be formed integrally together with the shaft contact noise-preventing portion and the locking piece contact noise-preventing portion. This makes it possible to allow the shaft contact noise-preventing portion and the locking piece contact noise-preventing portion to be easily provided in the shifter body, i.e., allow an assembling process of the automatic transmission shifter to be simplified, to thereby produce the automatic transmission shifter at low cost.

Preferably, in the above automatic transmission shifter, the lever contact noise-preventing element comprises an element body made of the soft material, wherein the element body has an upper portion formed to cover an entire circumference of an inner peripheral wall of the gate from thereinside, and a bottom edge surface which is concaved to define a locking piece-receiving recess, and wherein: the shaft contact noise-preventing portion is composed of the upper portion of the element body; and the locking piece contact noise-preventing portion is composed of a recess-defining wall defining the locking piece-receiving recess.

According to this feature, the shaft contact noise-preventing portion and the locking piece contact noise-preventing portion can be formed as a part of the element body, so that it becomes possible to more easily form the shaft contact noise-preventing portion and the locking piece contact noise-preventing portion.

Preferably, in the above automatic transmission shifter, the shifter body and the lever contact noise-preventing element are formed by a double molding process.

According to this feature, in conjunction with the process of forming the housing, the lever contact noise-preventing element consisting of a soft material having a hardness less than that of the housing can be formed by an integral molding process. Thus, it becomes possible to reduce the number of components and facilitate simplification of the assembling process.

Preferably, in the above automatic transmission shifter, the gate comprises: an automatic-shift-mode gate configured to allow the shift lever to be moved therealong in an automatic shift mode; a manual-shift-mode gate provided on one side of the automatic-shift-mode gate in a select direction and configured to allow the shift lever to be moved therealong in a manual shift mode; and a communication passage provided between the automatic-shift-mode gate and the manual-shift-mode gate, and wherein: each of the automatic-shift-mode gate and the manual-shift-mode gate is provided to extend in a shift direction; and the communication passage is formed to communicate between the automatic-shift-mode gate and the manual-shift-mode gate, and wherein the shaft contact noise-preventing portion is provided inward of an inner peripheral wall of each of the automatic-shift-mode gate, the manual-shift-mode gate and the communication passage.

According to this feature, for example, in a situation where the lever shaft is moved between the automatic-shift-mode gate and the manual-shift-mode gate, it becomes possible to suppress noise occurring when the lever shaft is brought into contact with the inner peripheral wall of each of the automatic-shift-mode gate and the manual-shift-mode gate, thereby ensure product quality suitable for an automatic transmission shifter having the automatic-shift-mode gate and the manual-shift-mode gate.

This application is based on Japanese Patent application No. 2013-133596 filed in Japan Patent Office on Jun. 26, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An automatic transmission shifter comprising a shifter body, and a shift lever movably held by the shifter body, wherein:
   the shifter body comprises a housing, and a lever contact noise-preventing element for preventing contact noise between the shifter body and the shift lever; and
   the shift lever comprises a lever shaft including an axially central portion in the form of a cylinder, and a locking piece provided to protrude laterally from an outer periphery of the central portion of the lever shaft and configured to allow the lever shaft to be releasably locked with respect to the shifter body,
   and wherein:
   the lever shaft has a slit extending in an up-down direction along an axis of the lever shaft on the outer periphery of the central portion;
   the locking piece has a protruding portion and is disposed in such a manner as to be movable in the up-down direction along the slit;
   the lever shaft accommodates therein a spring member biasing the locking piece upwardly;
   the housing comprises a gate movably penetrated by the lever shaft; and
   the lever contact noise-preventing element comprises an element body made of an elastic elastomer having a hardness less than a hardness of the housing, the element body comprising a shaft contact noise-preventing portion configured to prevent contact noise between the lever shaft penetrating the gate and the shifter body, and a locking piece contact noise-preventing portion configured to prevent contact noise between the locking piece and the shifter body, and wherein:

the element body has an upper portion formed to cover an entire perimeter of an inner peripheral wall of the gate from inside the gate, and a bottom edge surface that is concaved upward to define at least one locking piece-receiving recess in which the locking piece is releasably locked;

the shaft contact noise-preventing portion is composed of the upper portion of the element body and is provided inward of the inner peripheral wall of the gate in such a manner as to be interposed between the inner peripheral wall of the gate and the lever shaft;

the locking piece contact noise-preventing portion is composed of a recess-defining wall defining the at least one locking piece-receiving recess;

the lever shaft moves along the gate with the locking piece that is moved upward by a biasing force of the spring member to be locked in the locking piece-receiving recess;

the shaft contact noise-preventing portion and the locking piece contact noise-preventing portion are integrally formed, each using an elastic elastomer having a hardness less than the hardness of the housing; and the housing and the lever contact noise-preventing element are integrally formed.

2. The automatic transmission shifter as defined in claim 1, wherein the housing and the lever contact noise-preventing element are formed by a double molding process.

3. The automatic transmission shifter as defined in claim 1, wherein the gate comprises:

an automatic-shift-mode gate configured to allow the shift lever to be moved therealong in an automatic shift mode;

a manual-shift-mode gate provided on one side of the automatic-shift-mode gate in a select direction and configured to allow the shift lever to be moved therealong in a manual shift mode; and a communication passage provided between the automatic-shift-mode gate and the manual-shift-mode gate, and wherein:

each of the automatic-shift-mode gate and the manual-shift-mode gate is provided to extend in a shift direction; and the communication passage is formed to communicate between the automatic-shift-mode gate and the manual-shift-mode gate, and wherein the shaft contact noise-preventing portion is provided inward of an inner peripheral wall of each of the automatic-shift-mode gate, the manual-shift-mode gate and the communication passage.

* * * * *